(12) United States Patent
Mendel et al.

(10) Patent No.: US 9,072,992 B2
(45) Date of Patent: Jul. 7, 2015

(54) FUEL FILTER WITH FILTER RECOGNITION

(75) Inventors: Frank Mendel, Drensteinfurt (DE); Norbert Prinz, Greven (DE)

(73) Assignee: FIRMA HENGST GMBH & CO. KG, Muenster (DE)

( * ) Notice: Subject to any disclaimer, the term of this patent is extended or adjusted under 35 U.S.C. 154(b) by 1200 days.

(21) Appl. No.: 12/666,590

(22) PCT Filed: Jun. 25, 2008

(86) PCT No.: PCT/DE2008/001017
§ 371 (c)(1),
(2), (4) Date: Jun. 10, 2010

(87) PCT Pub. No.: WO2009/000247
PCT Pub. Date: Dec. 31, 2008

(65) Prior Publication Data
US 2010/0276352 A1 Nov. 4, 2010

(30) Foreign Application Priority Data

Jun. 26, 2007 (DE) .......................... 10 2007 029 460
Jul. 5, 2007 (DE) .......................... 10 2007 031 382

(51) Int. Cl.
| | | |
|---|---|---|
| *C02F 1/00* | (2006.01) | |
| *B01D 21/24* | (2006.01) | |
| *G01F 19/00* | (2006.01) | |
| *B01D 35/143* | (2006.01) | |
| *B01D 36/00* | (2006.01) | |

(52) U.S. Cl.
CPC ............ *B01D 35/143* (2013.01); *B01D 36/005* (2013.01); *B01D 2201/4046* (2013.01)

(58) Field of Classification Search
None
See application file for complete search history.

(56) References Cited

U.S. PATENT DOCUMENTS

| | | | | |
|---|---|---|---|---|
| 4,014,301 A | * | 3/1977 | Happel | 123/275 |
| 4,495,069 A | * | 1/1985 | Davis | 210/114 |
| 6,102,709 A | * | 8/2000 | Howard et al. | 439/66 |
| 6,126,823 A | * | 10/2000 | Soderlund et al. | 210/206 |
| 6,289,726 B1 | * | 9/2001 | Ferris et al. | 73/114.38 |
| 6,361,684 B1 | * | 3/2002 | Hawkins et al. | 210/91 |
| 2002/0144938 A1 | | 10/2002 | Hawkins et al. | |
| 2003/0121865 A1 | | 7/2003 | Winn et al. | |
| 2006/0067080 A1 | * | 3/2006 | Chen | 362/378 |

FOREIGN PATENT DOCUMENTS

| | | |
|---|---|---|
| EP | 1154149 A2 | 11/2001 |
| EP | 1400271 A1 | 3/2004 |
| FR | 2879944 | 12/2004 |

* cited by examiner

*Primary Examiner* — Nam Nguyen
*Assistant Examiner* — Richard Gurtowski
(74) *Attorney, Agent, or Firm* — Patricia M. Mathers

(57) ABSTRACT

A modification of a fuel filter for use with an internal combustion engine is described. The modification provides a switch element that, in conjunction with the water level sensor conventionally provided in the filter, enables detection of the presence or absence of a filter insert or whether an improper insert has been installed in the filter housing. When the filter insert is inserted or removed, the switch element makes or breaks an electrical circuit that is part of the water level sensor. The control unit is thus able to detect switch states of three different variables in the filter: the water level is/is not too high; the filter insert is/is not installed; or the correct filter is/is not installed. The control unit accordingly allows or prevents operation of the motor, depending on the detected switch state.

14 Claims, 12 Drawing Sheets

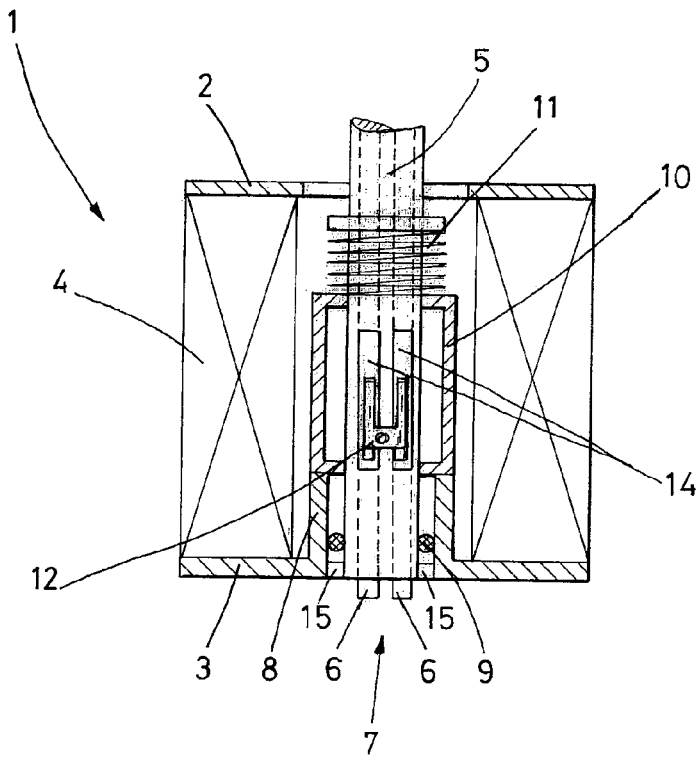
FIG.1
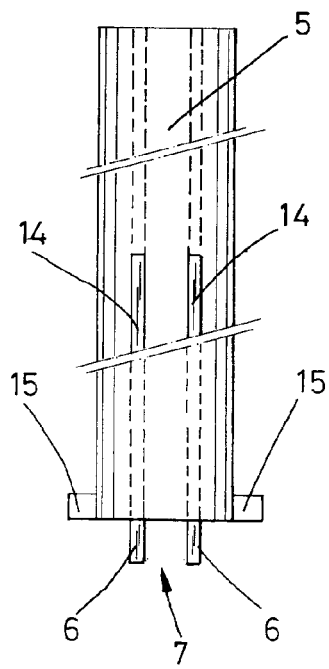
FIG.2
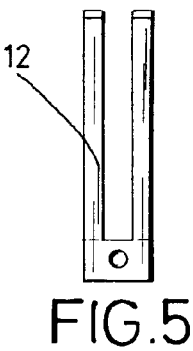
FIG.5
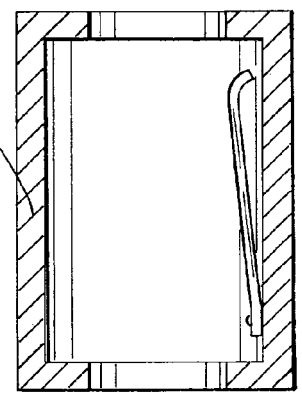
FIG.3
FIG.4

FUEL FILTER WITH FILTER RECOGNITION

BACKGROUND INFORMATION

1. Field of the Invention

The invention relates to a fuel filter for an internal combustion engine. More particularly, the invention relates to a fuel filter that has a replaceable filter and an electric switch that indicates an "OK" and a "not OK" operating state of the fuel filter.

2. Description of the Prior Art

Fuel filters with replaceable filter inserts are known in the field of art. Conventional fuel filters have a replaceable filter insert and a cap that closes the filter housing. It is possible to remove a used filter insert and replace it with a new one when the cap is open. Convention fuel filters have a water collection chamber in a lower end of the housing, or in a collection cap. The specific weight of water is greater than that of fuel, and this allows water to be separated from the fuel and collected in the water collection chamber.

The increasing precision of fuel injection systems results in an increasing sensitivity of components and fuel lines to contaminants in the fuel. It is particularly serious for the operation of the vehicle, if, in the course of performing a filter change, the filter housing is closed without a new or suitable filter insert having been installed. The wrong filter insert could have incorrect dimensions or have a filter surface that is unsuitable for the type of fuel that is used. Having no filter insert or an improper filter insert installed in the fuel filter can have serious consequences for the fuel injection system, because unfiltered or insufficiently filtered fuel, dirt particles, and other contaminants can now pass into the fuel-injection system, One of the undesirable fuel contaminants is water. The volume in the fuel tank includes air, and the fluctuations in temperature, such as occur, for example, as a result of temperature differences between nighttime and daytime temperatures, cause moisture to drop out of the air as condensation when the temperature drops. The formation of condensation is not something that the operator of the engine or maintenance personnel can prevent, and so, the presence of water in fuel is a problem that must be resolved within the internal combustion engine. For this reason, as a safety measure, conventional fuel filters are equipped with a water collection chamber for collecting the water condensation and a water level sensor, which sends a signal when the level of water in the collection chamber has reached a predetermined high level. The water level sensor has two electrical contacts that are spaced a distance apart from one another and placed relatively high up in the collection chamber, at a level that corresponds to a specified upper level of water that is deemed acceptable for operation of the filter system. The electrical conductivity of water differs from that of fuel and, when the water level in the water collection chamber rises above the specified level, the water creates a bridge between the two contacts, thereby significantly altering the electrical resistance between the two contacts. When the two conductors are electrically connected to one another by means of the water that is collected in the fuel filter, the value of the electrical resistance is designated the "short-circuit value", and, when the two conductors are separated from one another or are connected to one another only by the fuel or by insulating materials, the value of the electrical resistance is designated the so-called "insulation value".

The change from the "insulation value", which corresponds to the normal operation of the fuel filter, to the "short-circuit value", which corresponds to a too-high water content in the fuel filter, is measured and evaluated by an electronic switch, whereby the switch, for example, may be part of an electronic motor control unit. In the field of automobile construction, it is well-known to trigger an optical and/or acoustical signal within the driver's perceptual range, when water in the fuel filter reaches a defined level.

It is also known, to provide a more comprehensive safety measure to protect the internal combustion engine. For example, such a safety measure automatically prevents the motor from being started, should an unacceptably high level of water in the fuel filter be ascertained. This prevents water from reaching the clean side of the fuel filter and getting into the fuel injection system. Draining the water from the fuel filter system eliminates the "short circuit" caused by the water between the two contacts of the water level sensor and the electrical resistance between the two contacts reverts to its higher value. The higher electrical resistance is then detected by the electronic control, which now allows the engine to be started.

It is well-known in the field, irrespective of the aforementioned water level sensors, to provide temperature sensors or pressure sensors in the fuel filter. Depending upon the construction of the filter, one, two, or all three of the aforementioned sensor types may be provided in one fuel filter.

The task of the invention is to improve a generic fuel filter and specify a process in a way that enables the fuel filter to provide better protection for the engine associated with the fuel filter, with the least possible technical complexity and expense.

BRIEF SUMMARY OF THE INVENTION

The task is solved by providing a fuel filter and a method of changing a filter insert, as recited in the independent claims. The conventional fuel filter has a replaceable filter insert, a water collection chamber, a water level sensor, and an electrical conductor that is connected to a switch. The switch senses the presence of water at a certain level in the filter and accordingly signals that the fuel filter is in an operative or "OK" state or in an non-operative or "not OK" state. The fuel filter according to the invention uses the switch and its conductors that are conventionally provided as part of the water level sensor to also signal the presence or absence of a filter insert in the fuel filter. In other words, the invention uses an electrical switch, such as one that is customarily provided in the motor control unit anyway, to detect the presence or absence of the filter insert in the fuel filter. For this purpose the electrical properties of an electrical conductor change as a function of the presence or absence of the filter insert. For example, depending on the assembly status of the filter insert, the electrical resistance values may change when the electrical conductors are interrupted or closed, or the electrical capacitance values may change.

The electrical conductor is connected to the electrical switch and consequently, the switch is able to evaluate the electrical resistance or capacitance values and properly assume an "operative" switch state or an "non-operative" switch state. As previously mentioned, the "non-operative" switch state may result in a signal being displayed to the personnel or in an automatic shutdown of the internal combustion engine. For example, a switch contact may be provided in the fuel filter that is similar to a pushbutton or a door contact switch, whereby the switch contact is depressed when the filter insert is present, causing the two contacts of the electrical conductor open or close, depending upon the construction of the switch contact. When the filter insert is missing, the switch contact assumes its other switch position accordingly. Advantageously, a separate electrical conductor does not have to be provided to accomplish this. Rather, an electrical conductor that is already provided anyway may be used. This may be advantageously a conductor that is continuously connected to a sensor that is provided in the fuel filter or at least is then connected when the filter insert is present in the fuel filter.

In a conventional fuel filter that is equipped with a water level sensor, the two electrical conductors that are provided as part of the water level sensor anyway may also be used advantageously to indicate the presence of a fuel filter insert. In this way, the water level sensor may be used to indicate an actual presence in the fuel filter of the replaceable filter insert, which is provided for this fuel filter, completely independently of the monitoring of the water level in the fuel filter. This monitoring of the presence or absence of the filter insert may be done by evaluating the electrical resistance between the two electrical conductors of the water level sensor.

According to the invention, a switch element is provided for this purpose. The switch element is moveable and may selectively assume a contact position, in which case it makes contact with the two electrical conductors, or assume an interrupt position, in which case the connection between the two electrical conductors of the water level sensor is interrupted when the switch element is not in contact with at least one of the two conductors.

The switch element provided according to the invention may be constructed as a component that is separate from the rest of the filter, for example, in the form of a disk, a pin, or something similar. This separate component may, for example, be assembled by an assembly worker in the factory during the manufacture of the fuel filter. After the filter has been properly assembled, the assembly worker inserts this separate switch element into the fuel filter, for example, before he closes the filter housing with a cap. Inserting this separate switch element is more or less a type of quality control: the assembly worker confirms that the filter is properly assembled and, if applicable, is properly connected to adjacent components.

If, for example, the two electrical conductors of the water level sensor make contact with each other in the factory, that is, they result in a "short-circuit value", then the insertion of the switch element into the fuel filter creates a separation of these two conductors. Within the framework of the present invention, an electrical resistance that is measured between the two conductors and that is higher than the "short-circuit value" is referred to as a "separation". If the switch element is not inserted, then the two conductors are short-circuited. This is an electrical state that is comparable to an unacceptably high water level in the water collection chamber. As a result, regardless of whether or not water is actually present in the fuel filter, the electronic control evaluates the electrical resistance of the water level sensor just as it would if the water level were unacceptably high and, in this way, for example, prevents a motor connected to the fuel filter from starting or triggers a warning signal.

If, however, the two electrical conductors of the water level sensor are separated from one another in the factory, for example, the electrical value between the two conductors presents an "insulation value", which corresponds to no water or a low level of water, the switch element may be constructed to represent an electrical bridge that connects the two electrical conductors of the water level sensor.

The switch element may be constructed as an electrical bridge, that is, the switch element may be moveably mounted within the fuel filter and be biased to automatically assume a contact position. For example, the switch element is pushed into its contact position by force of gravity or a spring force, so that the switch element assumes this contact position, when the filter insert is missing in the fuel filter. When the switch element is constructed as an electrical conductor with good conductivity and negligibly low electrical resistance, this position corresponds to the short-circuit situation when the water level in the fuel filter is unacceptably high. Such a switch element is moved against the gravitational force or spring force from its contact position into its interrupt position only when the filter insert is assembled, so that now a short circuit between the two electrical conductors of the water level sensor is avoided and signals are present in the electronic control unit, which signal the proper operation of the fuel filter.

When the switch element is constructed as an electrical bridge, the switch element may advantageously be intentionally constructed not as an electrical conductor with good conductivity and negligibly low electrical resistance, but rather, as an element with a defined electrical resistance that is different from that of the short-circuit value and also from that of the insulation value. Such a third value, which may represent the electrical resistance between the two conductors, is called the "filter insert value". Compared to the usual evaluation of the sensor signals of the water level sensor, this third value provides additional information which can be automatically evaluated, for example, by means of the electronic switch, for example, of a motor control unit. This defined resistance enables automatic recognition of three different states of the fuel filter, assuming that the electronic control is constructed accordingly.

The first state that is recognizable is the occurrence of an unacceptably high water level within the water collection chamber of the filter. In this case, namely, a short circuit exists.

The second state that is recognizable is the presence of a specified filter insert in the fuel filter. In one case, the embodiment of the fuel filter is according to a first alternative, in which the switch element is constructed such, that it moves into its contact position when the filter insert inserted. This creates a bridge between the two conductors of the water level, and presents the defined electrical resistance. In this embodiment, following a filter change, the defined resistance value exists as the "filter insert value". Or, in another case, the embodiment of the fuel filter is according to a second alternative, in which the switch element is constructed such that, when the filter insert is inserted, the switch element moves from its contact position into its interrupt position, thereby no longer providing a bridge between the two conductors of the water level sensor. In this case, following a filter change, the insulation value exists The third state that is recognizable is the absence of the filter insert in the fuel filter. In the case in which the switch element is constructed according to the aforementioned first alternative, the insulation value is present, because the switch element is constructed such that it is moved into its contact position when the filter insert is inserted. If no filter insert is inserted into the fuel filter, then there is no bridge between the two conductors of the water level sensor. Alternatively, in the case in which the switch element is constructed according to the aforementioned second alternative, the "filter insert value" is present after a filter change, because the switch element with its defined resistance continues to be in its contact position and has not been moved into its interrupt position by the insertion of the filter insert.

According to the aforementioned first alternative, the fuel filter and the switch element may hereby advantageously be constructed such that the switch element provides a defined electrical resistance between the two conductors of the water level sensor when the filter insert is properly fitted in the fuel filter. If the two conductors had previously been either separated from each other or connected to one another, that is, the electrical resistance between them indicated the insulation value or the short-circuit value, they will be electrically connected to one another by the switch element, and, indeed, with a resistance value that corresponds neither to the insulation value nor to the short-circuit value, but rather, with a resistance that is referred to as the filter insert value.

Particularly when the switch element is handled together with the filter insert, for example, is constructed as a part of the filter insert, different filter inserts may be automatically distinguishable from one another by using correspondingly different electrical resistances in the switch elements of the various filter inserts. This enables the use of basically an identical construction of the fuel filter with several different types of vehicles or motors or fuels, thereby providing an economic advantage.

For example, the construction may be such that basically the same fuel filter is used for either gasoline or diesel engines. Or the fuel filter may be used with either mineral fuel or biodiesel fuel made of vegetable raw materials. Or the fuel filter may be installed in vehicles targeted for delivery to different geographical regions with differing fuel qualities.

Different fuel filters may be used in the basically identically constructed fuel filter. For example, filter inserts in which the filter surface is made of different materials having different filter meshes or different degrees of resistance or durability to certain substances may be inserted into one and the same fuel filter. Depending upon the planned area of application or the planned construction of the motor, the electronic control of the respective motor is adjusted in the factory to a certain filter type, that is, to a certain one of several different filter inserts, so that the switch element must have a predetermined electrical resistance in the fuel filter, in order to allow operation of the motor. If a non-specified electrical resistance is determined, the motor control unit may prevent the motor from being started, or shorter maintenance intervals may be specified. In the latter case, the appropriate warnings may be displayed to the operator of the motor after a correspondingly shorter period of operation than is normally the case, or some notice may be given to the operator. indicating that the filter insert is missing or that an incorrect, non-specified filter insert is installed.

For this reason, the method according to the invention includes the steps of altering the electrical resistance between the two electrical conductors of the water level sensor simultaneously when the filter insert is inserted and removed.

Assuming a water level sensor configured such that two conductors that are in contact with each other signal the operative state: when the filter insert is removed, a switch element, which had thus far separated the two conductors from one another, is also removed from the fuel filter, so that now the two electrical conductors come into contact with each other and result in the same electrical short-circuit value of the sensor that would result, when the two electrodes of the water level sensor are bridged by water, signalling the non-operative state.

Assuming the conventional construction of a water level sensor which is configured such that two electrical conductors separated from one another signal the operative state: during the process of changing a filter insert according to the invention, the fuel filter may be configured such that the switch element is moved into its contact position when the filter insert is removed from the fuel filter, so that now the two electrical conductors of the water level sensor are bridged, signalling the non-operative state.

If no new filter insert is inserted into the fuel filter, then in both aforementioned cases, following maintenance work, the same electrical resistance between the two conductors of the water level sensor will prevail, as if the two electrodes of the water level sensor are bridged by water collected in the fuel filter, namely, the short-circuit value. The corresponding electronic control, for example, a motor control unit, thus automatically reacts the same as it does to an excessive amount of water in the fuel filter. Therefore, the method according to the invention for changing a filter insert improves the safety for the operation of the filter and the safety for the technical device to be protected by the filter, such as an internal combustion engine, whereby the filter insert is handled as usual during maintenance. In other words, the method according to the invention improves operating safety without requiring more work.

The method according to the invention also includes a diagnostic procedure for checking a fuel filter that includes the step of altering the electrical resistance between the two electrical conductors of the water level sensor, depending upon whether or not a filter insert is installed in the fuel filter. In this way, additional information on the status of the fuel filter is obtained. This additional information improves the operational safety of the fuel filter, as well as the aggregate associated with the filter and which uses the fuel, with very small changes to existing systems relating the fuel filter and to the electronic switches that evaluate the signals of the water level sensor.

In a particularly advantageous embodiment, the diagnostic procedure may evaluate, as mentioned above, not only two switch states, but rather three. The first switch state, for example, is a "short circuit" state, wherein there is very low or no electrical resistance between the two electrical conductors of the water level sensor. Depending upon the structural design of the fuel filter, this resistance value may, for example, be caused by an excessively high water level in the fuel filter or by the absence of a filter insert.

The second switch state is a "correct resistance" state, which is a function of a predetermined electrical resistance. Depending upon the structural design of the fuel filter, this "correct resistance" may be the resistance value at the switch element, when an approved filter insert is present in the fuel filter, for example, in the form of the "filter insert value". This "correct resistance" may, however, alternatively also be the "insulation value" which occurs when, for example, the filter insert is assembled in the fuel filter and merely separates the two conductors, but does not itself create an electrical connection between them.

The third switch state is an "incorrect filter insert" state. This occurs, when the control unit determines an electrical resistance at the switch element that does not correspond to the short-circuit value, but also not to a specified electrical resistance of the switch element. Thus, this "incorrect" resistance value signals that a non-specified filter insert is installed, one that is improper and not intended for use with this motor.

The aforementioned switch element may be constructed on the filter insert itself. The filter insert may be conventionally constructed, that is, in the known manner, it may have a filter medium, such as a folded paper filter insert, and mechanically more stable components, made of plastic, such as, for example, a frame, or an upper and a lower end plate, or a so-called interior dome in the form of a tube-like component, which supports the filter medium that is arranged circumferentially around it against the forces exerted on it during the filter operation. In such cases, the switch element may advantageously be provided on the mechanically more stable components of the filter insert, for example, on an end plate or on the interior dome.

The switch element may, however, also be constructed as a separate component. For example, the switch element may be installed by an assembly worker or a mechanic as a separate component in the fuel filter, as described using the aforementioned disk or pin. Alternatively, such a separate component, also designated an "adapter", may be attached to a filter insert, so that afterwards, when the filter insert is installed, the adapter, which includes the switch element, is also automatically installed into the fuel filter. In this way, the mechanic may easily connect the switch element to the filter insert outside of the fuel filter, for example, outside the confined space of a vehicular engine compartment, and the filter insert may subsequently be installed into the fuel filter in the known manner, so that the handling of the switch element does not unnecessarily complicate the filter change for the mechanic.

BRIEF DESCRIPTION OF THE DRAWINGS

Embodiments of the invention are explained in more detail below, with reference to the accompanying drawings, in which preferred embodiments of the invention are shown. The drawings are merely schematic representations of the invention and are not drawn to scale. This invention should not, however, be construed as limited to the embodiments set forth herein; rather, the drawings are provided so that this disclosure will be complete and will fully convey the scope of the invention to those skilled in the art.

FIG. 1 is a cross-sectional view through the filter insert of a first embodiment of the fuel filter according to the invention, showing the water level sensor. Other components of the fuel filter are not shown for reasons of clarity.

FIG. 2 is an enlarged partial view of the embodiment shown in FIG. 1, illustrating features of the water level sensor.

FIG. 3 is a first view of the sliding sleeve of the switch element shown in FIG. 1.

FIG. 4 is a second view of the sliding sleeve.

FIG. 5 is an illustration of the tongue component in the sliding sleeve.

DETAILED DESCRIPTION OF THE INVENTION

Figure 6:
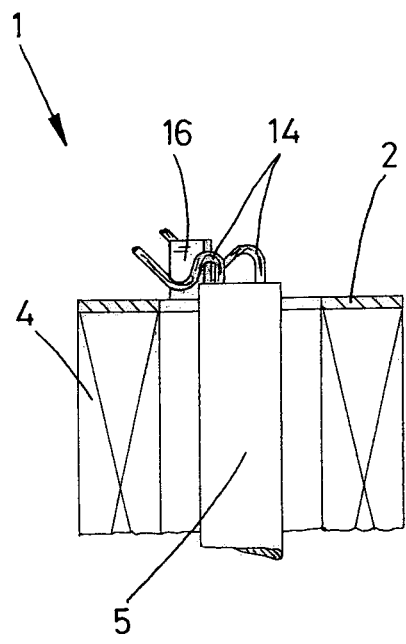
FIG. 6 is a partially broken-out cross-sectional view of the filter insert, showing a switch element that is a fin.

FIG. 1 shows a filter insert 1, which is essentially constructed in a known manner as a cylinder and has an upper end plate 2 and a lower end plate 3. The two end plates 2 and 3 are made of plastic. The filter insert 1 has a filter surface that extends between the end plates 2, 3, which is referred to as a filter medium 4. The filter surface may be constructed in conventional manner, for example, as a pleated filter made of a paper or synthetic material.

In the embodiment shown, the filter insert 1 is used in a suspended fuel filter, i.e., in a fuel filter whose cap is not arranged on the upper end of the filter housing, but rather on the lower end. The filter insert 1 is accordingly inserted into the filter housing from the bottom up and slid thereby onto a connection piece 5 that has two electrodes 6 on its lower end. The electrodes 6 are part of a water level sensor that is indicated as a whole by the number 7.

The filter insert 1 has an upward-extending collar 8 that extends radially inside the lower plate 3 and that is sealed against the connection piece 5 with a gasket 9. The collar 8 is constructed such that the filter insert 1 makes contact from below with a sliding sleeve 10 when the insert 1 is inserted into the fuel filter. The sliding sleeve 10 surrounds the connection piece 5 and is mounted on the piece so as to slide longitudinally along it. Inserting the filter insert 1 into the fuel filter pushes the sliding sleeve 10 farther upward on the connection piece 5.

The sliding sleeve 10 is pressed downward by a helical spring 11. This biasing spring force automatically forces the sleeve 10 to assume a position that is lower than the one shown in FIG. 1, when the filter insert 1 is absent from the fuel filter. Inserting the filter insert 1 into the fuel filter pushes the sliding sleeve 10 upward on the connection piece 5 against the force of the helical spring 11, into the position shown in FIG. 1, as previously described.

Gravity also urges the sliding sleeve 10 to automatically move into the lower position, when the filter insert 1 is missing from the fuel filter. Deviating from the embodiment shown, it is also possible that only this gravitational force be used. Advantageously, in the embodiment shown, the biasing force of the helical spring 11 is particularly reliable in ensuring the desired downward movement of the sliding sleeve 10 when the filter insert is removed from the fuel filter. Furthermore, this arrangement with the helical spring 11 may also be used in a fuel filter configuration in which the filter insert 1 is inserted into the fuel filter from above. In this case, the helical spring 11 forces the sliding sleeve 10 upward, when the filter insert 1 is missing from the fuel filter.

A U-shaped flexible tongue 12 is provided on the inside of the sliding sleeve 10. The tongue 12 provides a contact with the connection piece 5 and will be discussed in more detail below. The flexible tongue 12, or the flexible tongue 12 in conjunction with the sliding sleeve 10, represents a switch element. This switch element, together with two electrical conductors 14 of the water level sensor 7, enables a control unit (now shown) to detect the presence of the filter insert 1 in the liquid filter, as will be explained below in more detail.

FIG. 2 shows the connection piece 5 without the filter insert 1 surrounding it. The connection piece 5 is made of an electrically insulating material, such as a suitable fuel-resistant plastic. Two electrical conductors 14 are molded into the connection piece 5. A dotted line shows where the conductors 14 are each covered by the material of the connection piece 5, that is, they are insulated all around. On a certain section of the connection piece 5, the conductors 14 are exposed on the surface of the connection piece 5. They are spaced apart from one another a certain distance and are, thus, separated from each other electrically The two exposed sections of the conductors 14 are indicated by continuous lines. The lower ends of the conductors 14 protrude from the lower end of the connection piece 4 and provide exposed leads which form the two electrodes 6 of the water level sensor 7. Deviating from this embodiment, the electrodes 6 may be made of another material than the conductors 14, for example, of an especially oxidation-resistant material.

A stop 15 is provided at the lower end of the connection piece 5. The stop 15 may take the form of several projections spaced radially about the connection piece or of a continuous, circular flange. The stop 15 cooperates with the sliding sleeve 10 to restrict the downward movement of the sleeve. As a result, gravity and the biasing force of the helical spring 11 force the sliding sleeve 10 downward until it makes contact with the stop 15.

FIGS. 3 to 5 illustrate the sliding sleeve 10 and the flexible tongue 12 arranged therewithin. The sliding sleeve 10 is dimensioned so that it may be pushed onto the connection piece 5, for example, from above, before the connection piece 5 itself is assembled in the housing of the fuel filter. The geometry of the connection piece 5 and the sliding sleeve 10 structurally ensure that the sliding sleeve 10 may be placed on the connection piece 5 in only one specific angular position. In other words, the sliding sleeve 10 and the connection piece 5 are keyed, for example, by means of a protrusion on one component and a groove on another component or by means of a basically unround contour of the connection piece 5 and sliding sleeve 10, so that the sliding sleeve 10 is assemblable on the connection piece 5 in only one angular position.

The flexible tongue 12 is assembled on the inside of the sliding sleeve 10. FIG. 5 illustrates the U-shaped construction of the flexible tongue 12, which comprises two longer, parallel arms and a shorter cross-bar that connects the two arms. As illustrated in FIG. 3, the flexible tongue 12 is attached to the wall of the sliding sleeve 10 by its cross-bar, whereas the two arms of the flexible tongue 12 extend into the inner space of the sliding sleeve 10 and away from its wall. The sliding sleeve 10 may, for example, be made of plastic and constructed as an injection molded component, while the flexible tongue 12 is constructed to conduct electricity and, for example, is made of metal.

A pin that projects inward from the inner the wall of the sliding sleeve 10, used in conjunction with a bore in the cross-bar of the flexible tongue 12, may serve to affix the flexible tongue 12 to the sliding sleeve 10. The pin may be welded onto the sliding sleeve 10.

Alternative fastening means, such as threaded fasteners, rivets, and the like, are also possible to affix the flexible tongue 12 in the sliding sleeve 10, as illustrated in FIGS. 3 to 5. Deviating from the embodiment shown, the flexible tongue 12 may also be placed into the casting mold of the sliding sleeve 10. During the casting process, the casting material for the sleeve may be molded around the tongue 12 so that no additional fastening means is required.

With respect to its angular position, the sliding sleeve 10 is arranged on the connection piece 5 such that the two arms of the flexible tongue 12 make contact with the two electrical conductors 14 when the sliding sleeve 10 is placed at the corresponding section of the connection piece 5.

In the embodiment shown, the sliding sleeve 10 is pressed downward and against the stop 15 by the helical spring 11. Because the conductors 14 run along the inside of the connection piece 5 in its lower area, the arms of the flexible tongue 12 do not make contact with the conductors 14, so that the conductors 14 are not bridged by the flexible tongue 12. The switch element that is formed by the flexible tongue 12, or by the sliding sleeve 10 together with the flexible tongue 12, thus assumes an interrupt position when the filter insert 1 is missing from the fuel filter.

By contrast, the switch element assumes its contact position when the filter insert 1, according to FIG. 1, is assembled in the fuel filter. In this situation, the sliding sleeve 10 is pushed up and the two arms of the flexible tongue 12 move into the area of the connection piece 5 in which the two electrical conductors 14 are exposed along the surface of the connection piece 5, so that the two arms make contact with, and the flexible tongue 12 provides an electrically conducting bridge between the two electrical conductors 14.

The flexible tongue 12 is made of an electrically conducting substance, for example, a metallic material, but it has a defined electrical resistance. In its contact position, it connects the two electrical conductors 14 with a resistance that can be evaluated by the electronic switch, which also evaluates the signals of the water level sensor 7. Thus, this defined electrical resistance enables automatic diagnosis of several different configurations that relate to whether the fuel filter is in an operative state that may be designated as "OK" or in an non-operative state that may be designated "not OK". The OK state is diagnosed when, namely, a filter insert 1 is present in the fuel filter and there is no, or only a little, water in the fuel filter. The diagnosis is possible because the defined electrical resistance of the switch element can be measured between the two electrical conductors 14. The "not OK" state is diagnosed when there is too much water in the fuel filter. This diagnosis is possible, because the "short-circuit value" of the electrical resistance can be measured between the two electrical conductors 14, because electrical current will not flow through the comparatively higher electrical resistance of the switch element. The "not OK" state is also diagnosed when the filter insert 1 is missing from the filter because, when the filter insert 1 is missing in the fuel filter, then the "insulation value" of the electrical resistance can be measured between the two electrical conductors 14, because neither the switch element nor the water creates a bridge between the two electrical conductors 14.

Figure 10:
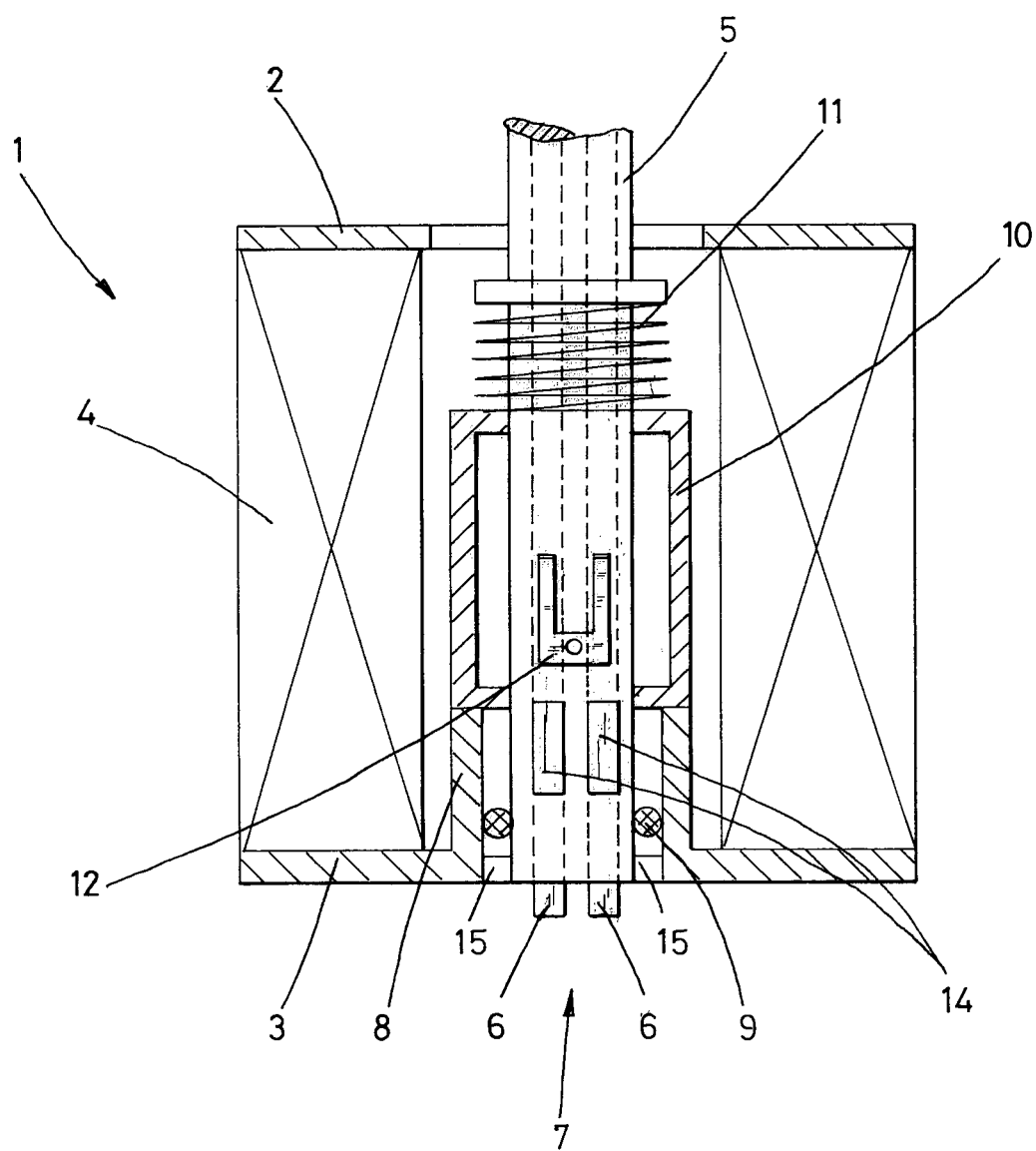
FIG. 10 illustrates a fourth embodiment of the filter insert according to the invention.

In an embodiment that differs from the embodiment of FIG. 1 and that is shown in FIG. 10, in the lower region of the connection piece 5, exposed portions of the conductors 14 extend along the surface of the connection piece 5. In this case, the arms of the flexible tongue 12 make contact with the conductors 14 when the filter insert 1 has been removed from the fuel filter and the sliding sleeve 10 is pressed by the helical spring 11 onto the lower end of the connection piece 5 and against the stop 15.

The flexible tongue 12 is also constructed differently from the embodiment of FIG. 1 and, also as shown in FIG. 10, does not have a defined resistance of a specific, average magnitude, but instead has an optimum electrical conductivity with a very low resistance. When the flexible tongue 12 is in the aforementioned contact position, the switch element thus causes a short circuit between the two electrical conductors 14 that is comparable to the short-circuit that arises when the water level inside the fuel filter is such, that it electrically connects the two electrodes 6 of the water level sensor 7 with one another.

When the filter insert 1 is removed from the fuel filter, the electrical switch assumes the same switching state as it would for an unacceptably high water level in the fuel filter, so that, for example, a warning signal is triggered or the start of the engine is prevented. On the other hand, in the embodiment of FIG. 10, when the filter insert 1 is inserted, the sliding sleeve 10 is pushed upward and shifted into the interrupt position of the switch element, in which, namely, the two electrical conductors 14 are not connected to each other by the flexible tongue 12, because, in this position, the arms of the flexible tongue 12 make contact externally with the non-conductive material of the connection piece 5.

Within the framework of another modification of this basic embodiment of FIGS. 1 and 10, which is not shown, the flexible tongue 12 may be constructed such, that it does not have optimum electrical conductivity with very low electrical resistance, but instead has a defined resistance of average magnitude. Thus, when the filter insert 1 has been removed from the fuel filter and the sliding sleeve 10 is pressed by the helical spring 11 onto the lower end of the connection piece 5 and against the stop 15, an electrical connection is, in fact, made between the two electrical conductors 14, but it is not a short circuit between the two electrical conductors 14. Different operating states of the fuel filter may be detected by means of a suitable switch, such as, for example, the motor control unit. In this way, different electrical resistances may be used to detect different operating states, such as a missing filter, an improperly installed filter, the wrong filter installed, or an unacceptably high water level.

For example, the state "filter insert improperly installed" may be indicated by a high electrical resistance, which arises when the flexible tongue 12 is separated from the two electrical conductors 14 and makes contact with the electrically insulating material of the connection piece 5. The state "water level unacceptably high" may be indicated by a very low electrical resistance or a short circuit. This situation arises when the electrodes 6 of the water level sensor 7 are short-circuited by water when the water level is unacceptably high. The state "filter insert missing" may be indicated by an average electrical resistance. This situation arises when the flexible tongue 12 makes contact with the two electrical conductors 14 and connects them with the defined resistance of the flexible tongue 12.

Basically, the sliding sleeve 10 and the helical spring 11, as shown in FIGS. 1 to 5, may be provided with a fixed filter. For example, according to the embodiment shown, these components may be affixed to the connection piece 5, or they may be affixed to a protective dome that is provided in the inside of the fuel filter and that prevents the filter medium 4 from collapsing under the temperatures and pressures that prevail during operation of the fuel filter.

As an alternative to this, the switch element may be provided on the replaceable filter insert. In this way, it is possible to identify the different filter inserts by providing each specific type of filter insert with a switch element that has a specific electrical resistance. FIGS. 6 to 9 illustrate extremely simplified embodiments of filter inserts 1 that are equipped with different types of switch elements.

Figure 7:
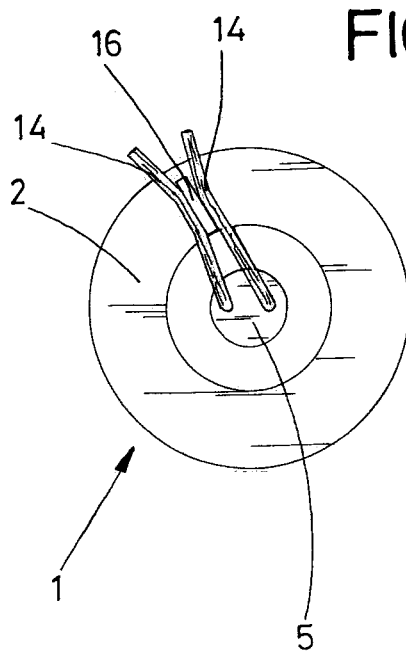
FIG. 7 is a top view of the filter insert and switch element shown in FIG. 6.

FIGS. 6 and 7 illustrate a filter insert 1 that includes a switch element 6 that is a fin 16. The fin 16 is oriented upward, on the upper end plate 2. The two electrical conductors 14 that extend from the lower electrodes 6 through the connection piece 5 are constructed in the form of a pair of spring clips, which, when the filter insert 1 is not assembled in the fuel filter, lie against each other due to their form and their spring-elasticity. As a purely schematic drawing, FIG. 6 does not illustrate how the upper end of the connection piece 5 is affixed in the housing of the fuel filter, nor does it illustrate in detail how the course of the two electrical conductors 14 actually extends in the transition section from the connection piece 5 to the housing of the fuel filter. These figures should merely schematically illustrate that, when inserting the filter insert 1 into the fuel filter, the fin 16 is guided as a separator between the two electrical conductors 14. Without the filter insert 1, the two conductors 14 contact each other, creating the short-circuit value of electrical resistance, so that the electronic switch assumes the same switch state that is assumed when the level of water in the fuel filter is unacceptably high. FIG. 7 is a top view of the embodiment of FIG. 6, which illustrates how the fin 16 is situated between the two spring-clip-like electrical conductors 14 so as to separate them from one another.

The fin 16 may be made of plastic and, for example, be manufactured as a single piece with upper end plate 2 using the injection molding process. Selecting a suitable plastic material allows the fin 16 to insulate the two electrical conductors 14 from each other. The fin 16 may, however, also be manufactured using another material that has no insulating properties, but has a significantly higher electrical resistance relative to the short-circuit value, so that the electrical resistance between the two conductors 14 assumes a "filter insert value" when the filter insert 1 is inserted in the fuel filter.

Instead of a special material for the fin 16, the fin 16 may also be manufactured from insulating material, that is, electrically conductive surfaces in the form of electrical contacts may be provided on both sides of the fin 16 and these contacts may be connected with a defined electrical resistance, so that, in this case, too, the fin 16 does indeed act as a separator, but does not insulate the two electrical conductors 14 from each other. The fin 16 instead separates the conductors 14 by means of a defined electrical resistance, so that, in this case, too, the electrical resistance assumes a "filter insert value" when the filter insert 1 is in the fuel filter.

Figure 8:
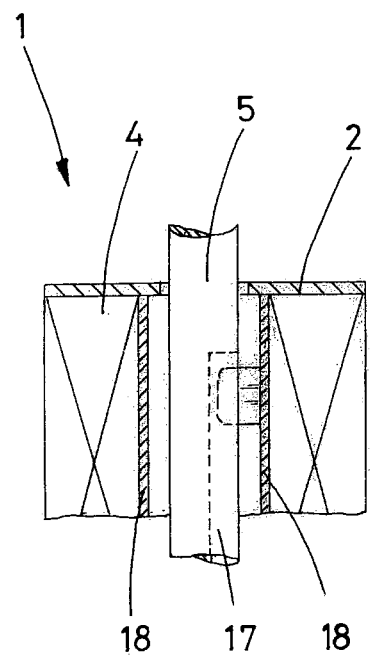
FIG. 8 illustrates an alternative embodiment of a fin as a switch element.
Figure 9:
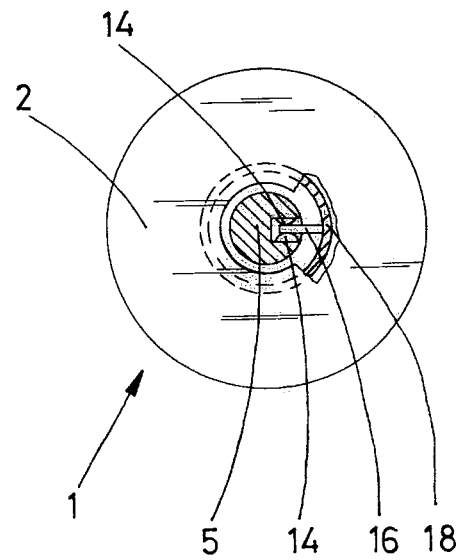
FIG. 9 is a top view of the switch element shown in FIG. 8.

FIGS. 8 and 9 illustrate a further embodiment with an alternative mounting possibility for a fin 16. Here, a groove 17 that opens at the lower end of the connection piece 5 is provided in the connection piece 5. The fin 16 is provided on the inside of the filter insert 1, whereby, in this embodiment, the filter insert 1 has an interior dome 18, that is, a tube-shaped, fluid-permeable protective body for the filter medium 4, which, unlike a protective dome with a fixed filter, is part of the filter insert 1 and is replaced together with the filter insert 1. The two electrical conductors 14 enter into the inside of the groove 17 at a predetermined height of, the connection piece 5, that is, they lie there exposed. In the embodiment in FIGS. 8 and 9, the conductors 14 are constructed as spring clips that are biased to make contact with each other and are separated from each other by the fin 16 when the filter insert 1 is inserted, in a manner similar to the embodiment of FIGS. 6 and 7.

The embodiments illustrated in FIGS. 6-9 enable a differential diagnosis of the fuel filter states when the two electrical conductors 14 are not in contact with each other, but are instead spaced apart as long as the filter insert 1 is not inserted into the fuel filter. When the filter insert is not inserted, the two electrical conductors 14 are insulated from each other because they do not touch. The electrical resistance in this case is the insulation value. This insulation value is an indication that there is no filter insert in the fuel filter. This enables a diagnosis of a missing filter. When the filter insert is inserted into the fuel filter, however, the defined electrical resistance across the two conductors 14 in the area of the fin 16 corresponds to the "filter insert value". Accordingly, the presence of the filter insert may be automatically determined. By contrast, a measurable short circuit between the two electrical conductors 14 is an indication of too much water in the fuel filter, because the excessively high water level has electrically connected the two conductors 14 and short-circuited them.

Figure 11:
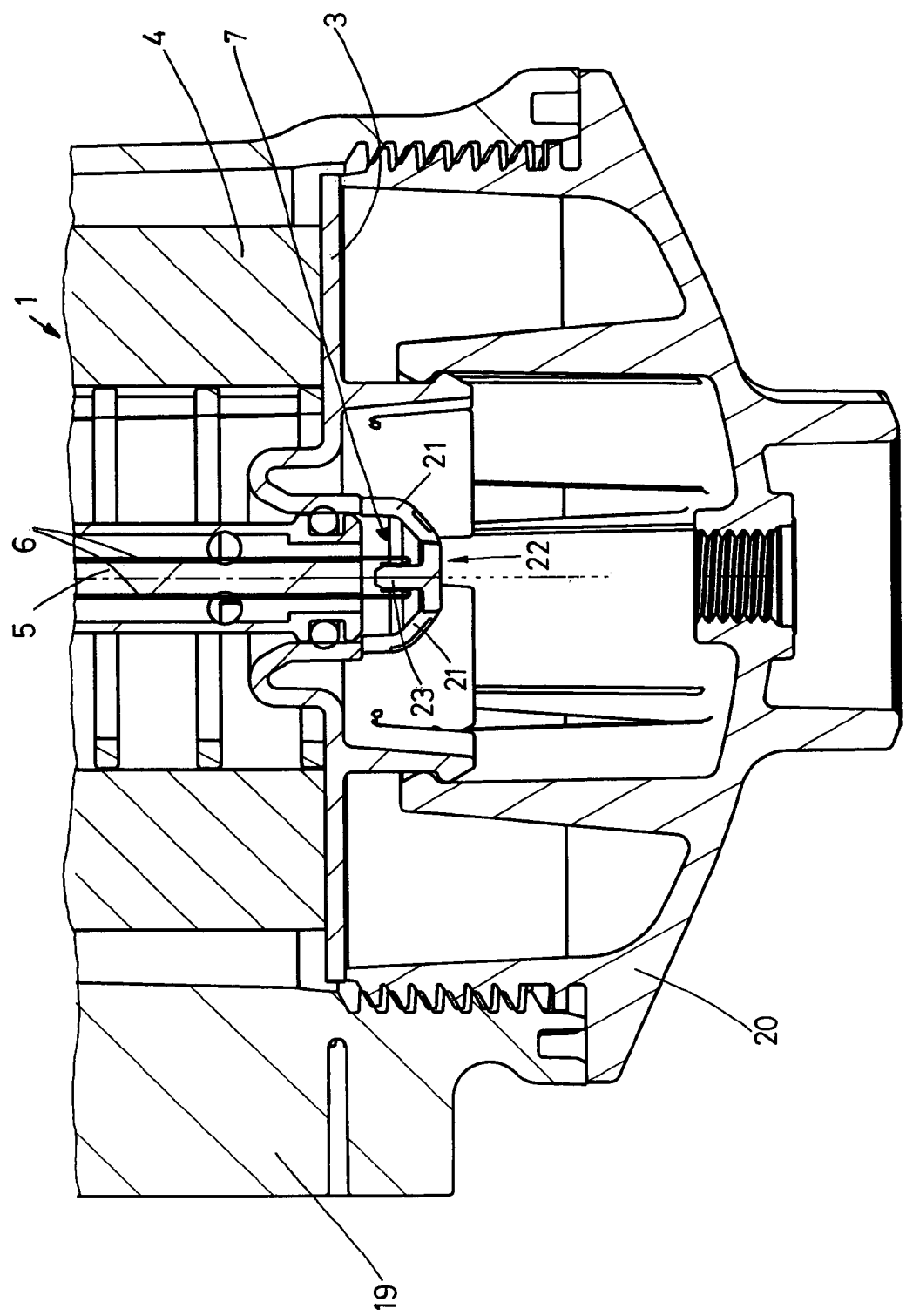
FIG. 11 illustrates an embodiment of the fuel filter according to the invention, with the filter insert assembled in the filter.

FIG. 11 illustrates a section of a filter with a filter housing 19, which is suspendingly mounted and has a screw cap 20 arranged on the bottom that closes the filter housing 19. The screw cap 20, with its threaded circular wall, pushes against the lower end plate 3 of the filter insert 1 and holds this plate in its predetermined position. Two electrodes 6 extend downward on the connection piece 5, the lower ends of which form the water level sensor 7. In the embodiment shown, water collects in the lower area of the filter housing 19, particularly in the area of the screw cap 20, due to its higher, specific weight. A downward-projecting cup 22 is formed in the lower end plate 3. Openings 21 for draining water are provided in the cup 22. When the level of this water reaches a defined level, it passes through openings 21. The cup 22 has a central pin 23 that extends upward between the two electrodes 6 of the water level sensor 7 and thereby prevents these two electrodes 6 from short-circuiting. Rather than with the conductors 14 making contact with each other, the short circuit is instead caused by a high level of water that has collected in the filter housing 19, in which case, the water level sensor 7 emits the alarm.

Figure 12:
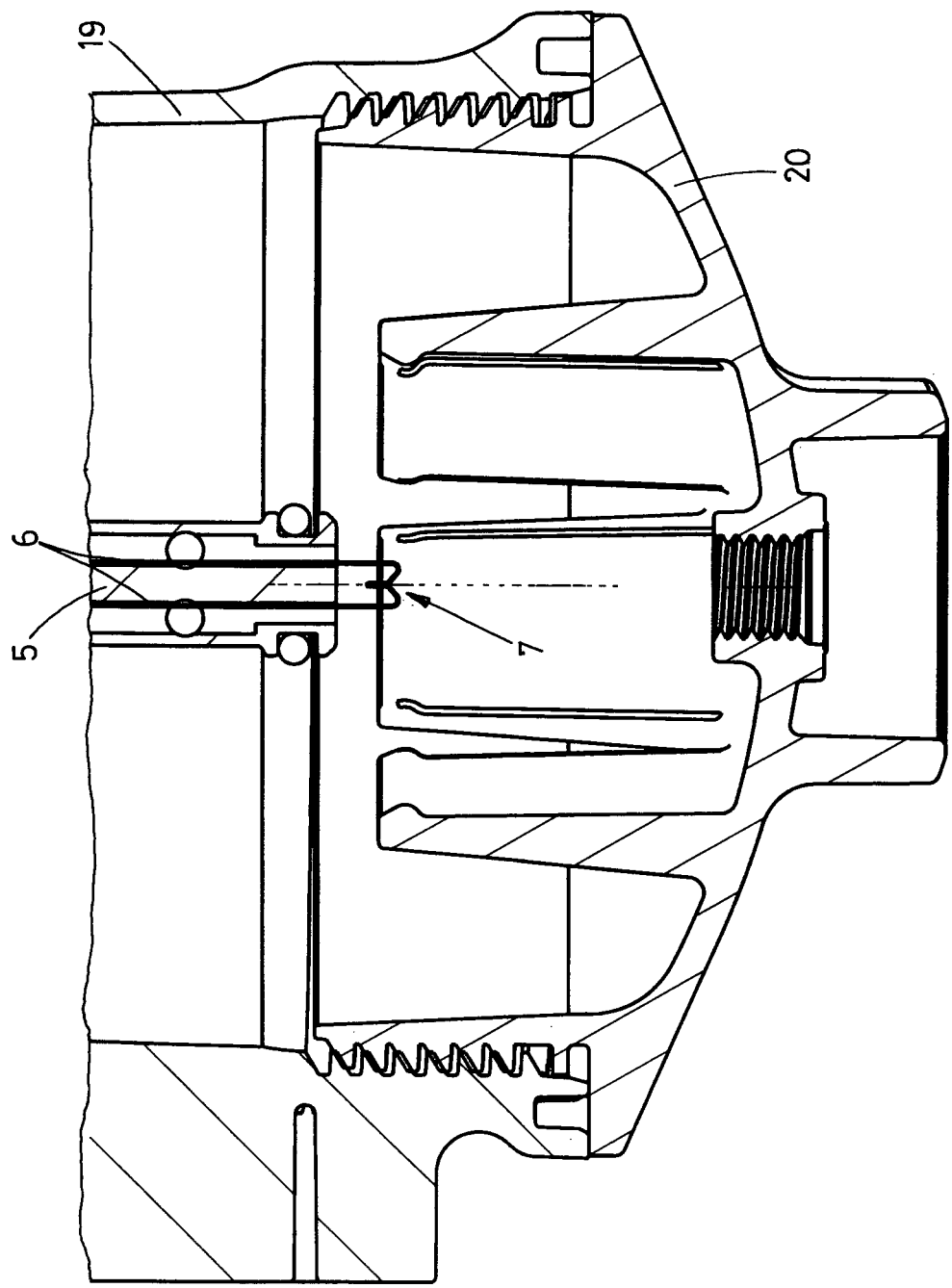
FIG. 12 illustrates the embodiment of FIG. 11, without the filter insert.

FIG. 12 illustrates the same embodiment as FIG. 11, although in a state in which the filter housing 19 is closed with the screw cap 20, without the filter insert having been inserted into the filter housing 19. The two electrodes 6 are made of spring-elastic wires or spring-elastic metal strips, each of which is bent into an approximate J-shape on its free end. If these free ends of the electrodes 6 are not pressed apart by the pin 23 of the filter insert 1, they make contact with each other and cause the water level sensor 7 to short-circuit, so that the same alarm signal is generated as would be when an unacceptably high water level is present in the filter.

Figure 13:
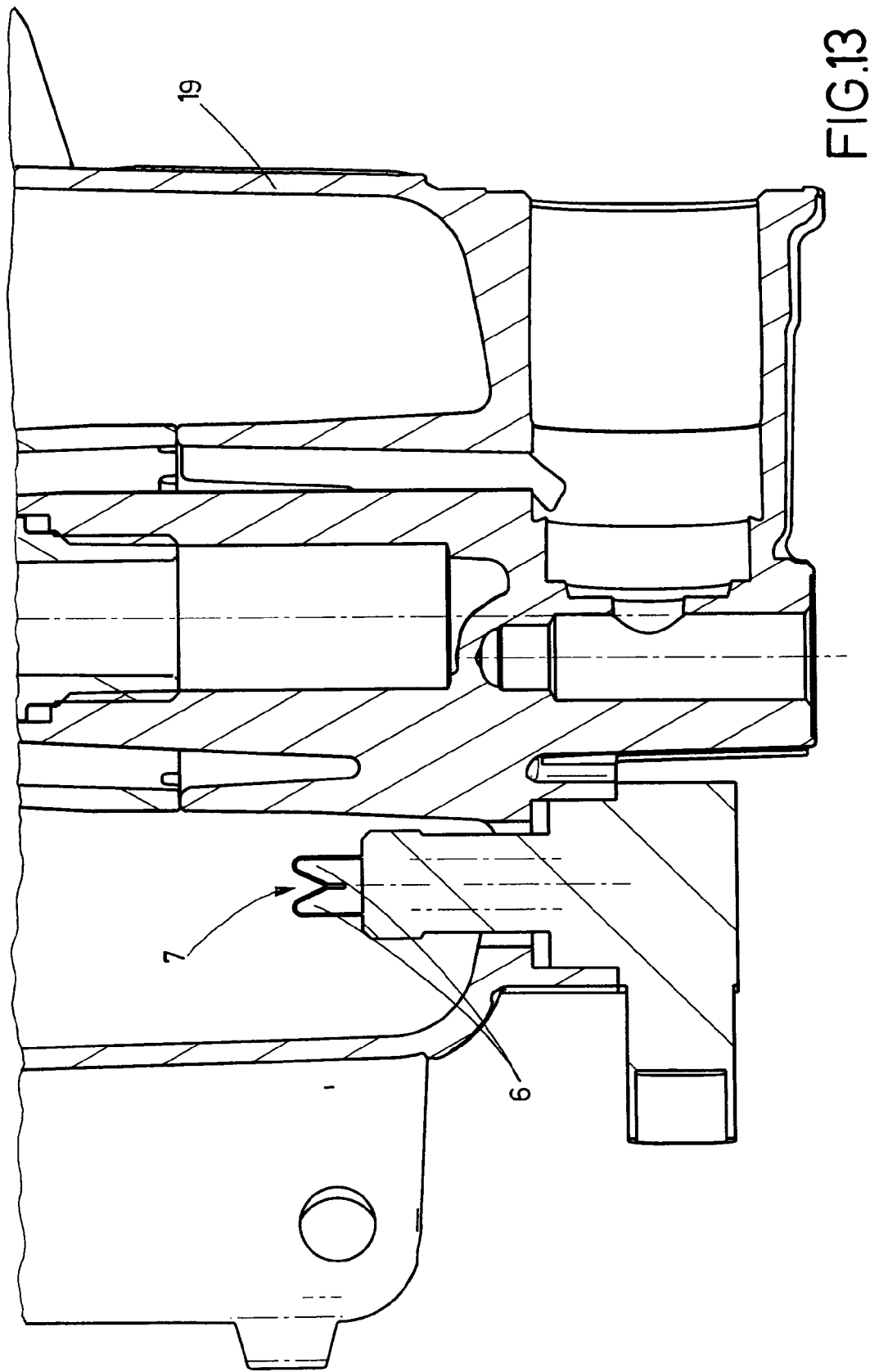
FIG. 13 illustrates an embodiment of the fuel filter according to the invention, without a filter insert.

FIG. 13 illustrates an embodiment in which the lower area of the filter housing 19 is again shown in a longitudinal cross-section. This particular filter, however, is assembled upright, and thus has a screw cap on the upper area of the filter 19, so that this screw cap is not visible in the selected drawing. The water level sensor 7 is formed by two electrodes 6, which, similar to the embodiment in FIGS. 11 and 12, are constructed as wire clips bent into J-shapes. FIG. 13 shows the filter housing 19 without an inserted filter insert.

Figure 14:
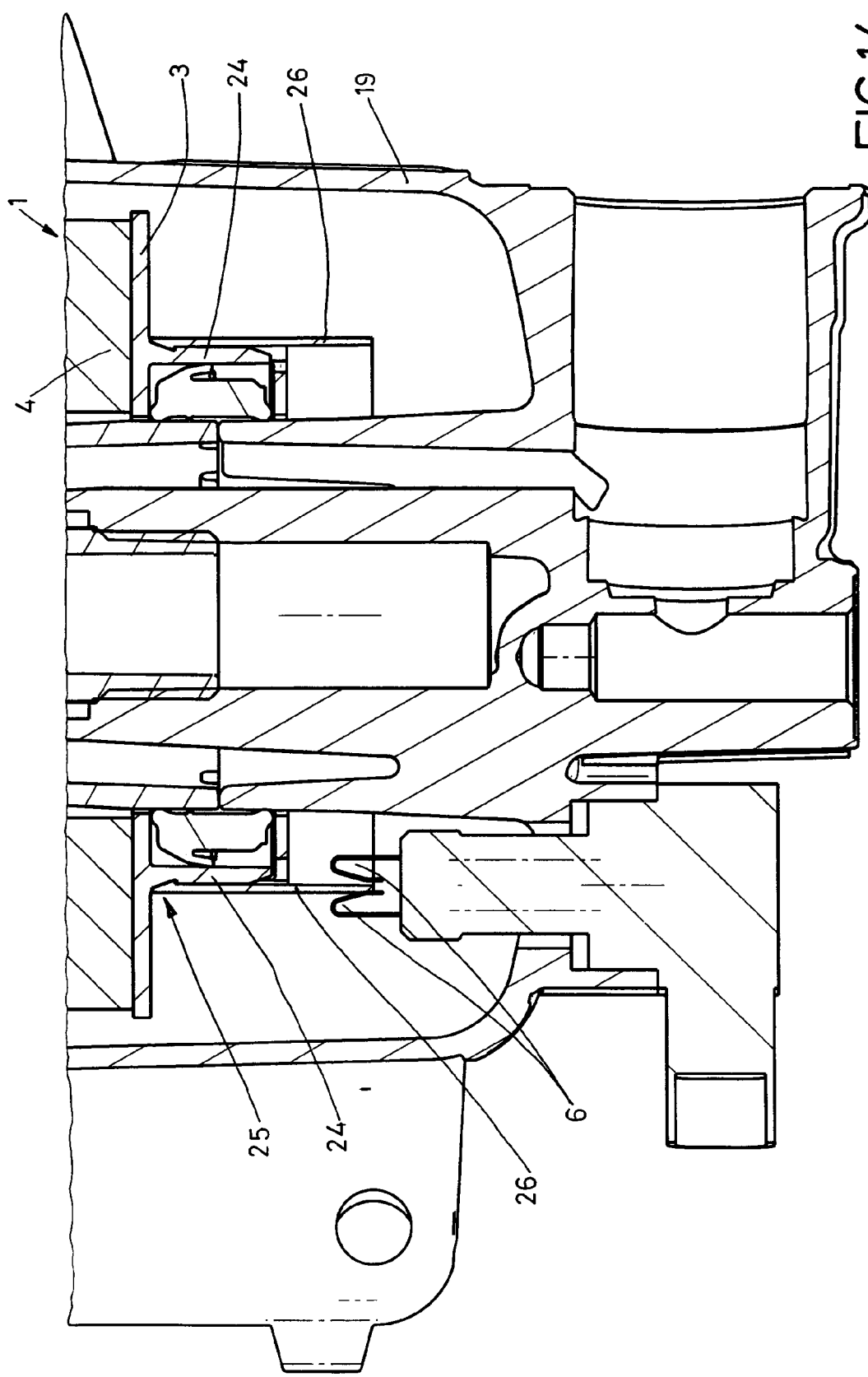
FIG. 14 illustrates the embodiment of FIG. 13, with the filter insert installed.

FIG. 14, by contrast, illustrates the same embodiment with an inserted filter insert 1. The lower end plate 3 of the filter insert 1 forms a circumferential collar 24, which supports an external actuation ring 26 by means of a snap contour 25. When the filter insert 1 is inserted a sufficient distance into the filter housing 19, this actuation ring 26 extends between the two electrodes 6 of the water level sensor 7 and prevents them from short-circuiting, as long as the water level in the filter housing is not correspondingly high.

Figure 15:
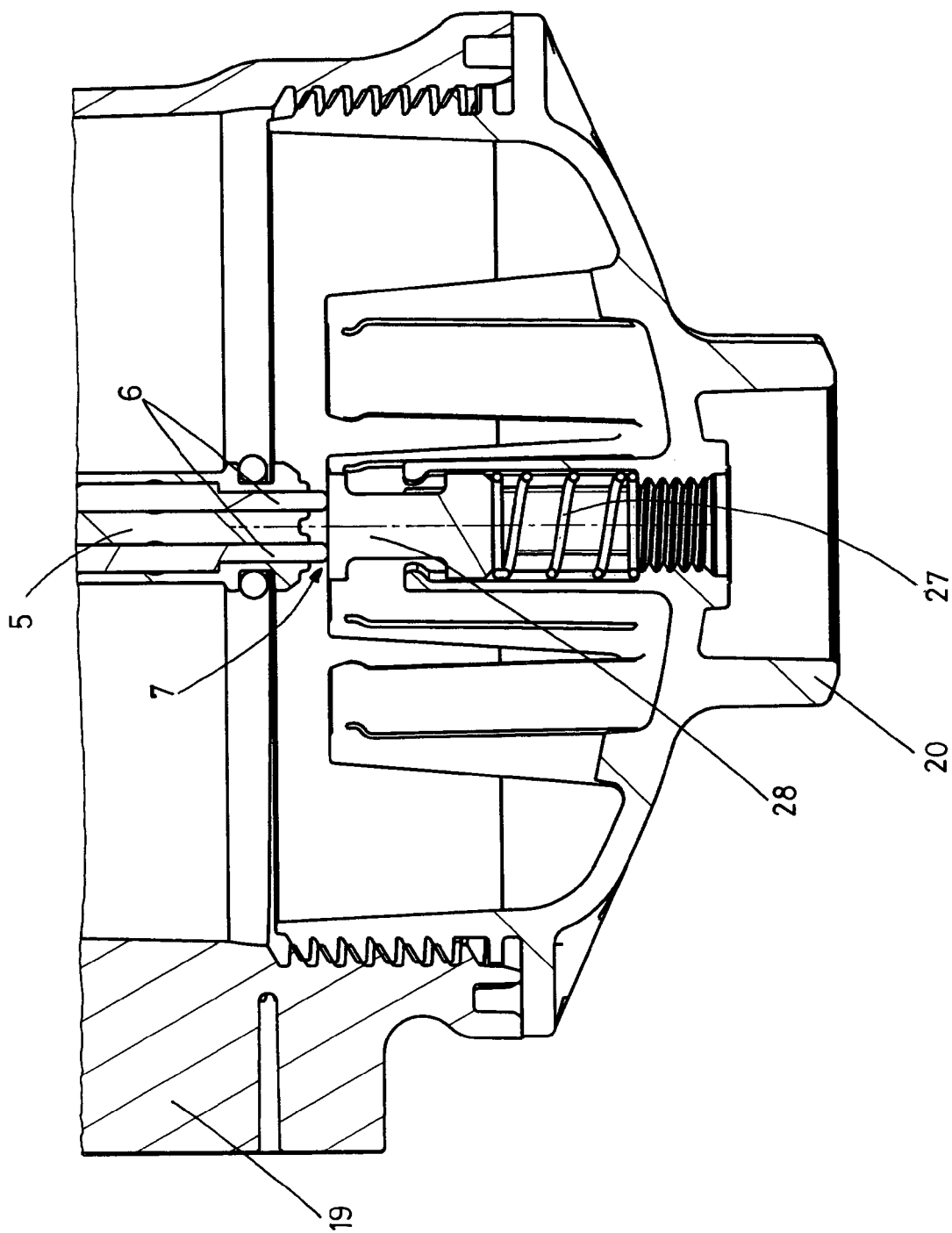
FIG. 15 illustrates an embodiment of the fuel filter according to the invention, without the filter insert.

FIG. 15 illustrates another embodiment of a suspended filter arrangement: As in FIGS. 11 and 12, the screw cap 20 is provided here on the downward-facing opening of the filter housing 19. The electrodes 6 of the water level sensor 7 are constructed as pins. A cap spring 27 is provided in the screw cap 20. The spring 27 is constructed as a helical spring and supports a contact body 28. When, as shown in FIG. 15, no filter insert is inserted in the filter housing 19, the cap spring 27 presses the contact body 28 against the two ends of the electrodes 6. The contact body 28 is conductive, at least in the area of the contact surface in which the contact body 28 makes contact with the two electrodes 6, so that the contact body 28 short-circuits the two electrodes 6 and causes a signaling of the water level sensor 7.

Figure 16:
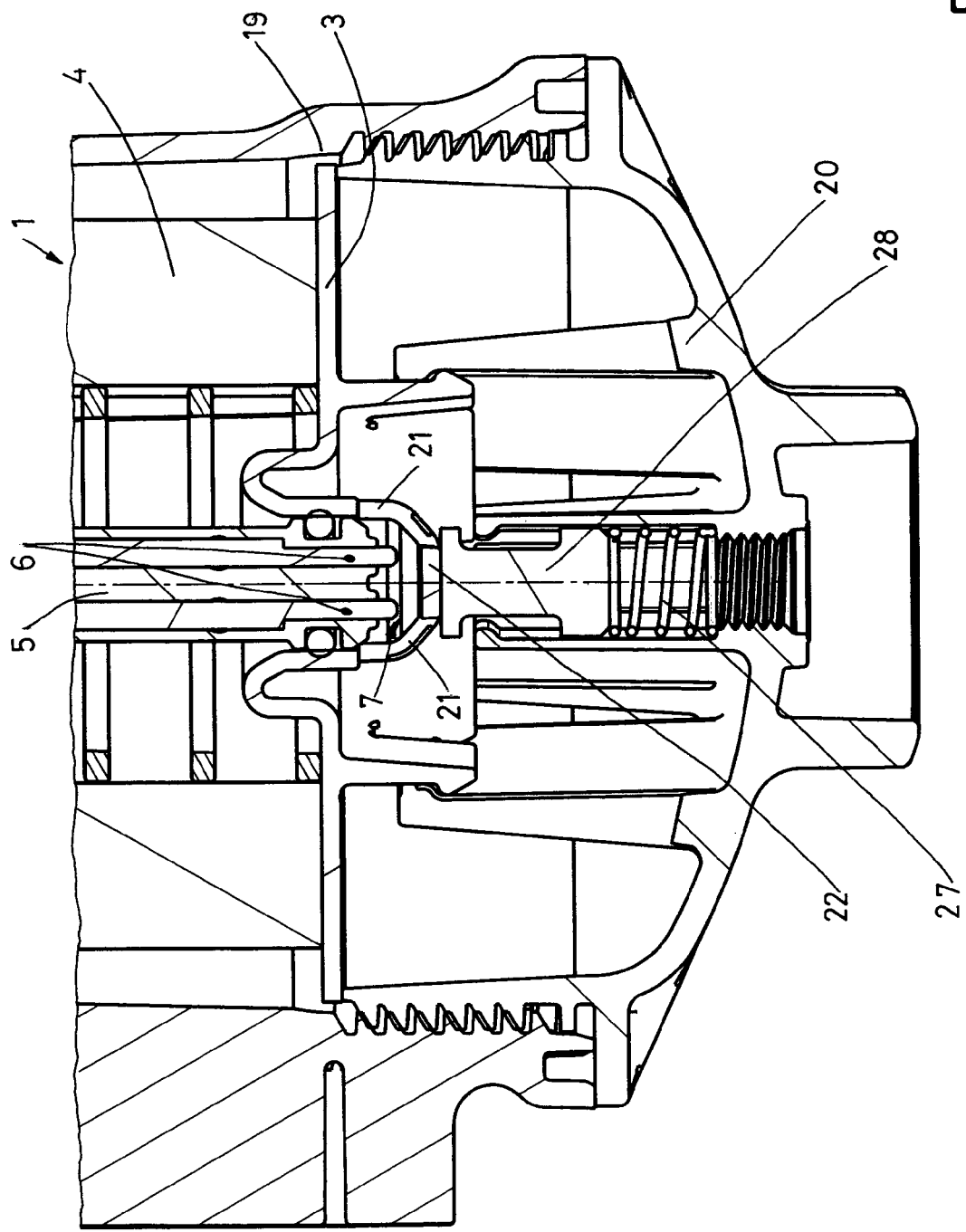
FIG. 16 illustrates the embodiment of FIG. 15, with the filter insert.

FIG. 16 illustrates the embodiment of FIG. 15 with an inserted filter insert 1: Also in this embodiment, the cup 22 is formed in the lower end plate 3 of the filter insert 1 with openings 21. The cup 22 pushes the contact body 28 downward against the force of the cap spring 27 and holds the contact body 28 a distance away from the water level sensor 7.

Deviating from the embodiment illustrated in FIGS. 15 and 16, the contact body 28 may be eliminated and, in its place, the cap spring 27 be constructed such that the cap spring 27 itself makes contact with the electrodes 6 and short-circuits these two electrodes 6 when no filter insert 1 is inserted. For this purpose, on its end where it makes contact with the cup 22 or the electrodes 6, the cap spring 27 may have spring windings that have a decreasing diameter, in contrast to the always identical diameter shown in the illustrations.

Figure 17:
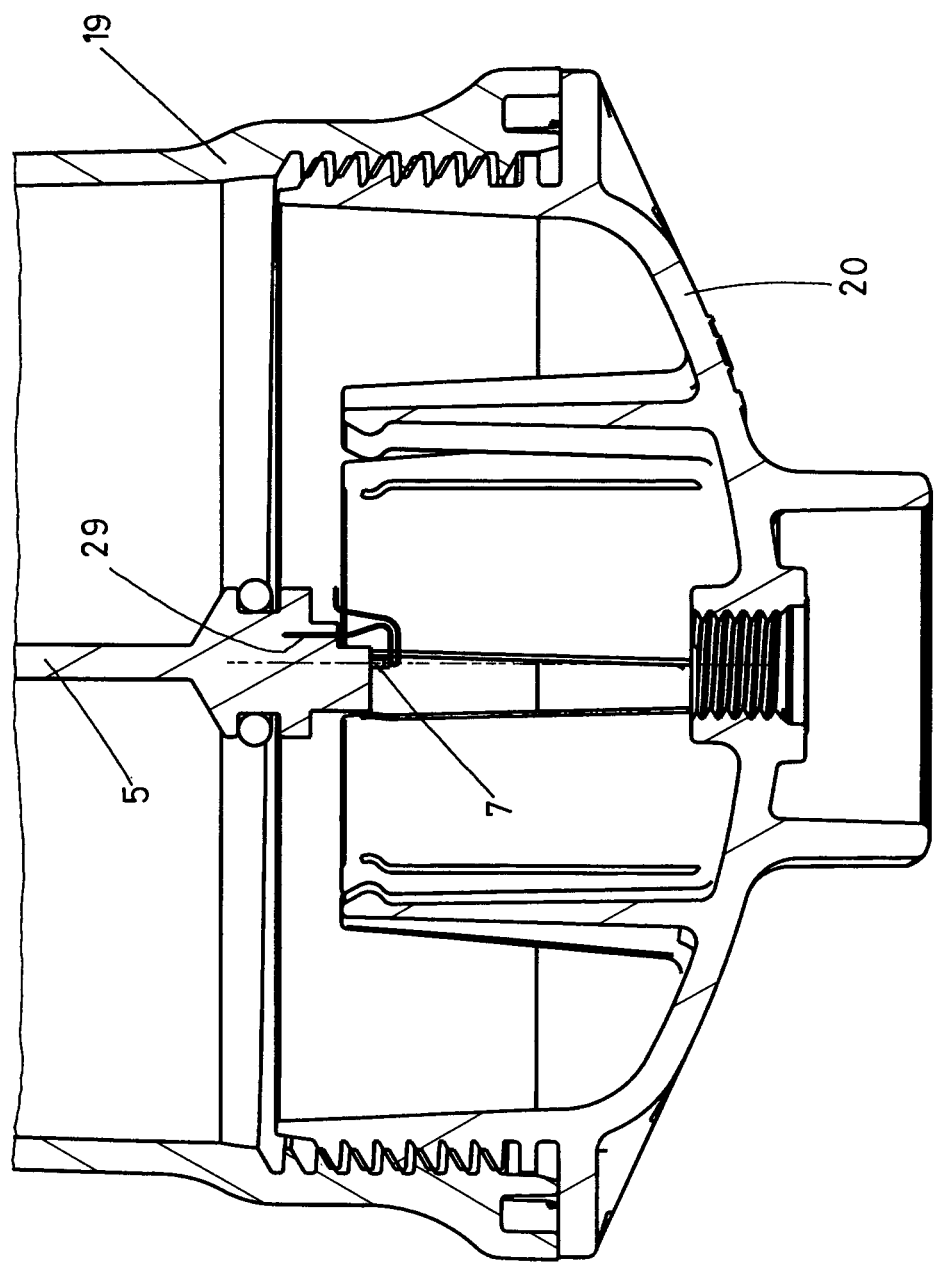
FIG. 17 illustrates an embodiment of the fuel filter according to the invention, without the filter insert.

FIGS. 17 to 20 illustrate again an embodiment that has a suspended filter with a lower screw cap 20. The connection piece 5 has a pin-like water level sensor 7 on its lower end (best seen in FIGS. 19 and 20), as well as a spring-elastic contact wire 29 that is affixed at a first end 29A in the connecting piece 5 and has a second end 29B that is freely moveable. The contact wire 29 has a contact section 29C, which is bent in a 180 degree hairpin curve, as shown in FIG. 17, and serves as a contact with the water level sensor 7. As shown in FIG. 17, when the filter insert 1 is missing from the filter housing 19, the contact section 29C of the contact wire 29 makes contact with the water level sensor 7 and causes a short circuit of its electrodes, and thus, triggers an alarm of the water level sensor 7.

Figure 18:
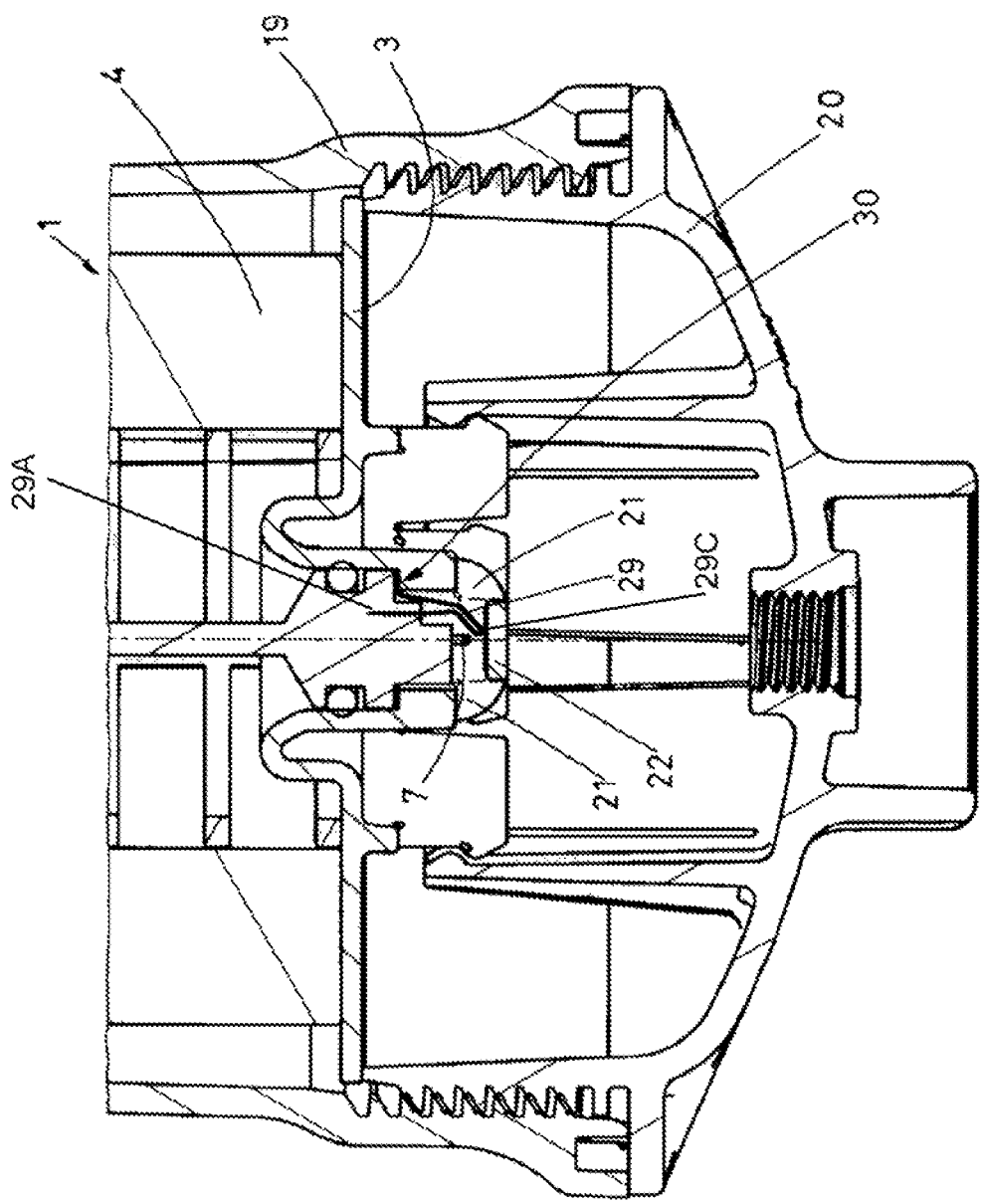
FIG. 18 illustrates the embodiment of FIG. 17, with the filter insert.

FIG. 18 illustrates a filter insert 1 inserted into the filter housing 19. As previously described, the lower end plate 3 of the filter insert 1 forms a cup 22 with drainage openings 21. The cup 22 also forms a circumferential, inward-protruding projection or shoulder 30, which makes contact with the freely movable second end 29B of the contact wire 29. This effectively pulls the contact section 29C of the contact wire 29 away from the water level sensor 7 so that it is now spaced a distance apart from the water level sensor 7.

Figure 19:
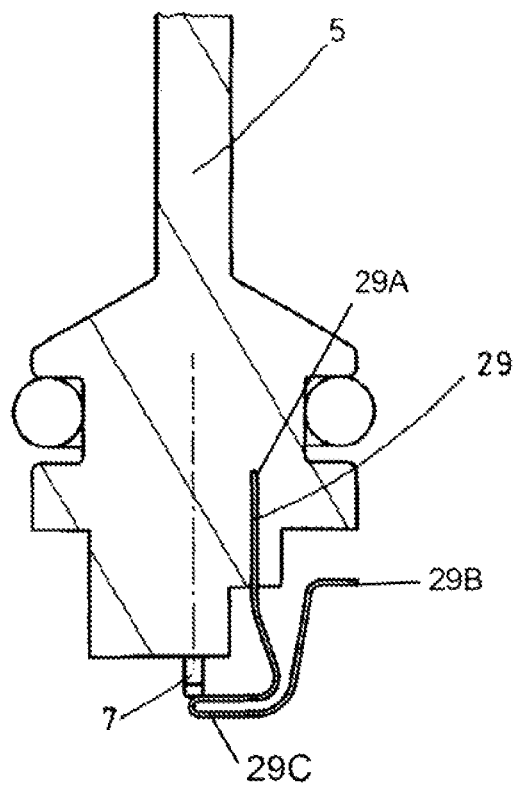
FIG. 19 is an enlarged partial view of the embodiment of FIG. 17, with the filter absent and showing a closed contact on the water level sensor.

FIG. 19 is an enlarged partial view of the embodiment of FIG. 17, with the filter insert 1 missing from the filter housing, and showing particularly the water level sensor 7 and the contact wire 29. In this figure, the contact section 29C is making contact with the water level sensor 7.

Figure 20:
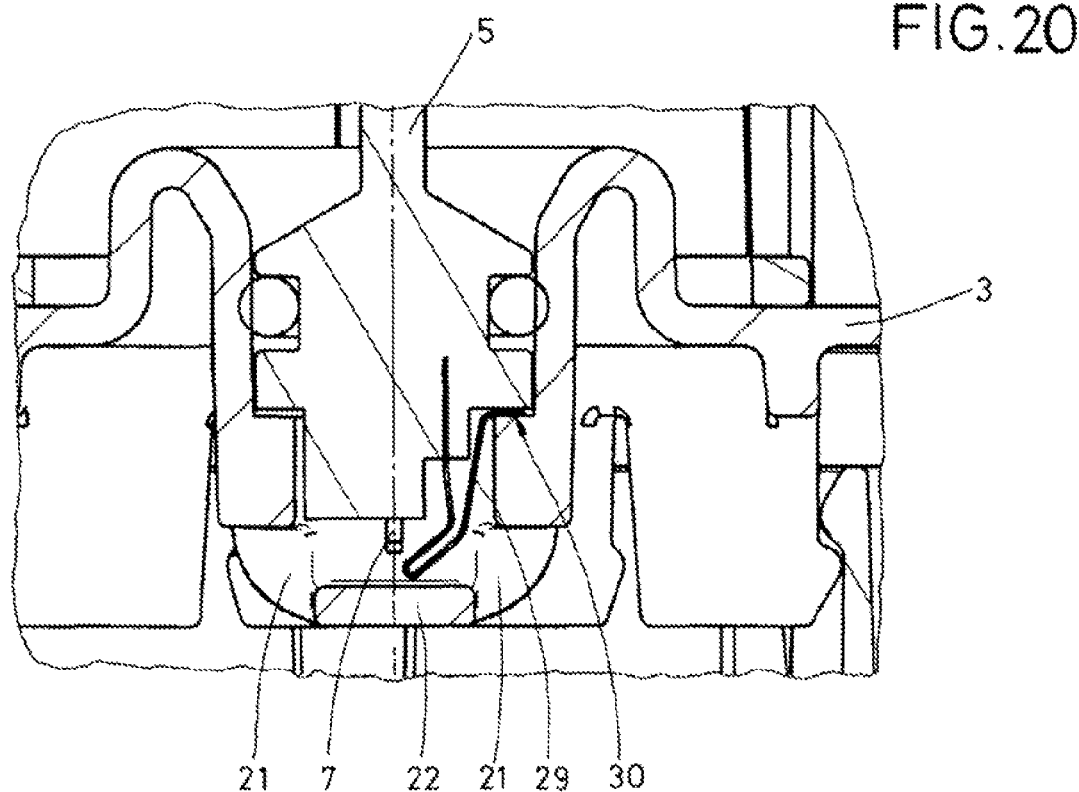
FIG. 20 is an enlarged view of a section of the embodiment shown in FIG. 17, with the filter insert installed and showing an open contact on the water level sensor.

FIG. 20 is an enlarged partial view of the embodiment of FIG. 18, with a filter insert 1 inserted into the filter housing. The circumferential shoulder 30 of the cup 22 formed in the lower end plate 3 is constructed such, that, when the filter insert 1 is inserted into the filter housing 19, the shoulder 30 comes into contact with and pushes against the free, curved second end 29B of the contact wire 29. When the filter insert 1 is inserted far enough into the filter housing 19, the shoulder 30 causes the contact wire 29 to bend such that the contact section 29C is pulled away from the water level sensor 7, as shown in FIGS. 18 and 20.

The invention claimed is:
1. A fuel filter of a combustion engine capable of diagnosing operative and non-operative states, the fuel filter comprising:
   a filter housing;
   a replaceable filter insert that is insertable into the filter housing;

a switch element that is movable between a contact position and an interrupt position;

two electrical conductors that are connectible to the switch element;

a water collection chamber that collects water separated from fuel; and a water level sensor that is connected to the electrical conductors when the filter insert is inserted into the housing, such that the electrical conductors extend down into the water collection chamber;

wherein a resistance value and a capacitance value of the electrical conductors to each other varies as a function of the presence or absence of the filter insert in the filter housing;

wherein the two electrical conductors are electrically connectible with each other via the water when the water level is high enough to reach the electrical conductors, and are also electrically connectible to the switch element;

wherein the resistance value that exists between the two electrical conductors has a first value when the switch element is in the contact position and a second value that differs from the first value when the switch element is in the interrupt position.

2. The fuel filter of claim 1, wherein the two conductors contact each other when the filter insert is absent from the housing and wherein the switch element is constructed as an electrically insulating element that is insertable in the housing between the two conductors, thereby interrupting contact between the two conductors.

3. The fuel filter of claim 1, wherein the switch element is actuatable by means of the filter insert, such that the switch element is moved into a first position when the filter insert is inserted into the filter housing.

4. The fuel filter of claim 1, wherein the switch element is moved into the contact position by a spring.

5. The fuel filter of claim 1, wherein the switch element is moved into the contact position by force of gravity.

6. The fuel filter of claim 1, wherein the switch element is insertable into the filter housing together with the filter insert.

7. The fuel filter of claim 1, wherein the switch element has a defined electrical resistance that differs from the electrical resistance of the two conductors of the water level sensor that are connected by water.

8. The fuel filter of claim 1, wherein the switch element is constructed as a component separate from the filter insert.

9. The fuel filter of claim 1, wherein the switch element comprises:

a connection piece provided within the filter housing, the water level sensor being mounted on the connection piece;

a sliding body mounted on the connection piece;

a biasing spring provided on the connection piece, the biasing spring exerting a biasing force on the sliding body; and a contact body mounted on the sliding body;

wherein the sliding body and biasing spring cooperate to effect a change in an electrical value of the two conductors of the water level sensor;

wherein, when the filter insert is removed from the fuel filter, the biasing spring urges the sliding body to a second position that interrupts contact between the contact body and the two conductors, resulting in an electrical value across the two conductors that corresponds to a "filter insert missing" signal; and wherein, inserting the filter insert into the fuel filter forces the sliding body against the force of the biasing spring, bringing the sliding body to the first position in which the contact body makes contact with the two conductors, resulting in an electrical value across the two conductors that corresponds to a "filter insert installed" signal.

10. The fuel filter of claim 9, wherein the contact body is provided on an inside of the sliding body, and wherein the two conductors have an insulated section that is embedded in the connection piece and a contact section that is an exposed section of the two conductors along an outer surface of the connection piece;

wherein, inserting the filter insert into the filter housing urges the sliding body to slide along the connection piece so as to move into the first position and into contact with the contact section of the two conductors; and wherein, removing the filter insert allows the biasing spring to force the sliding body to slide along the connection piece to the second position at the insulated section of the two conductors.

11. The fuel filter of claim 9, wherein the replaceable filter insert has an end plate and the switch element comprises a fin that is mounted on the end plate, the fin having properties that enable insertion and removal of the fin to result in a change in the electrical value of the two conductors of the water level sensor;

wherein the two conductors are constructed as a pair of spring clips that are biased toward each other;

wherein, when the filter insert is removed from the fuel filter, the fin is moved to the second position in which the two conductors make contact with each other to create a resulting electrical value across the two conductors corresponding to a "filter insert missing" signal; and wherein, inserting the filter insert into the fuel filter forces the fin between the two conductors, thereby separating the two conductors from one another and changing the electrical value across the two conductors to a value that corresponds to a "filter insert installed" signal.

12. The fuel filter of claim 1, the switch element comprising:

a connection piece in the filter housing, the connection piece having a groove; a filter insert having a support dome;

a fin that is mounted on the support dome, the fin serving as the switch element and having properties that enable changing the electrical value of the two conductors of the water level sensor, independent of a level of water in a water collection chamber;

wherein the two conductors are constructed as electrically conductive strips along a portion that extends each along one wall of the groove and wherein the fin is insertable into the groove;

wherein, when the filter insert is removed from the fuel filter, the two conductors are separated from each other and wherein the electrical value across the two conductors corresponds to a "filter insert missing" signal;

wherein, inserting the filter insert into the fuel filter forces fin into the groove between the two conductors, thereby making contact with the two conductors and changing the electrical value across the two conductors to a "filter insert installed" signal.

13. The fuel filter of claim 1, wherein the switch element comprises:

a connection piece assembled within the filter housing and on which is assembled the water level sensor, the water level sensor having a conductor pin that extends from the lower end of the connection piece; and a switch element that selectively makes and interrupt an electrical contact with the conductor pin, thereby signalling a "OK" switch state and a "not OK" switch state, as a function of a presence or absence of the filter insert, respectively, independent of the level of water in the water collection chamber;

wherein the switch element is a contact wire that moves between a first position when the filter insert is inserted into the filter housing, the first position signalling the "OK" switch state, and a second position when the filter insert is removed, the second position signalling the "not OK" switch state.

14. The fuel filter of claim 13, wherein the contact wire is in the second position when the replaceable filter insert is removed and in the first position when the replaceable filter insert is inserted.

* * * * *